United States Patent
Wenger et al.

(10) Patent No.: US 7,352,809 B2
(45) Date of Patent: Apr. 1, 2008

(54) SYSTEM AND METHOD FOR OPTIMAL TRANSMISSION OF A MULTITUDE OF VIDEO PICTURES TO ONE OR MORE DESTINATIONS

(75) Inventors: Stephan Wenger, Berlin (DE); Herold Williams, Dayton, OH (US)

(73) Assignee: Polycom, Inc., Pleasanton, CA (US)

( * ) Notice: Subject to any disclaimer, the term of this patent is extended or adjusted under 35 U.S.C. 154(b) by 730 days.

(21) Appl. No.: 10/371,823

(22) Filed: Feb. 21, 2003

(65) Prior Publication Data

US 2004/0179591 A1    Sep. 16, 2004

(51) Int. Cl.
H04N 7/12    (2006.01)
H04N 7/14    (2006.01)

(52) U.S. Cl. .................. 375/240.02; 348/14.1
(58) Field of Classification Search ............... 348/14.1, 348/14.08, 14.09, 14.01; 710/60; 375/240.26, 375/240.02, 240.29; 370/477, 535
See application file for complete search history.

(56) References Cited

U.S. PATENT DOCUMENTS

| | | | |
|---|---|---|---|
| 5,412,431 A | 5/1995 | Vogel | |
| 5,489,943 A | 2/1996 | Kutner | |
| 5,506,844 A | 4/1996 | Rao | |
| 5,572,248 A | 11/1996 | Allen et al. | |
| 5,612,900 A | 3/1997 | Azadegan et al. | |
| 5,686,963 A | 11/1997 | Uz et al. | |
| 5,745,178 A | 4/1998 | Hartung et al. | |
| 5,751,337 A | 5/1998 | Allen et al. | |
| 5,995,151 A | 11/1999 | Naveen et al. | |
| 6,028,896 A | 2/2000 | Jang et al. | |
| 6,160,573 A | 12/2000 | Allen et al. | |
| 6,160,846 A | 12/2000 | Chiang et al. | |
| 6,188,792 B1 | 2/2001 | Chujoh et al. | |
| 6,195,388 B1 | 2/2001 | Choi et al. | |
| 6,215,820 B1 | 4/2001 | Bagni et al. | |
| 6,263,020 B1 | 7/2001 | Gardos et al. | |
| 6,445,405 B1 | 9/2002 | Allen et al. | |
| 6,624,841 B1 * | 9/2003 | Buchner et al. | 348/14.1 |

(Continued)

FOREIGN PATENT DOCUMENTS

EP    1 096 803 A2    5/2001

(Continued)

OTHER PUBLICATIONS

W. Ding and B. Liu, "Rate Control of MPEG Video Coding and Recording by Rate-Quantization Modeling," IEEE Trans. Circuits and Systems for Video Tech, 6(1) (Feb. 1996) pp. 12-20.

(Continued)

*Primary Examiner*—Gims Philippe
(74) *Attorney, Agent, or Firm*—Wong, Cabello, Lutsch, Rutherford, & Brucculeri, LLP (57) ABSTRACT

A system and method for optimal transmission of a multitude of video pictures consisting of end video encoders wherein more than one encoder is utilized. The system and method improve the image quality of a broadband image comprised of a plurality of images by generating a new bit rate encoder based upon a prior bit rate as determined by a bit rate determiner, thereby managing the distribution of available bandwidth.

14 Claims, 11 Drawing Sheets

U.S. PATENT DOCUMENTS

| | | | |
|---|---|---|---|
| 6,654,825 B2* | 11/2003 | Clapp et al. | 710/60 |
| 6,847,656 B1* | 1/2005 | Wu et al. | 370/477 |
| 7,075,564 B1* | 7/2006 | Jewell et al. | 348/14.01 |
| 2003/0007516 A1* | 1/2003 | Abramov et al. | 370/535 |
| 2004/0022322 A1* | 2/2004 | Dye | 375/240.26 |

FOREIGN PATENT DOCUMENTS

| | | |
|---|---|---|
| EP | 1 250 012 A2 | 10/2002 |
| WO | WO 00/21302 | 4/2000 |
| WO | WO 02/45017 | 6/2002 |

OTHER PUBLICATIONS

Haskell, B.G., A. Puri and A.N. Netravali, "Digital Video: An Introduction to MPEG-2," ISBN: 0-412-08411-2, Chapman & Hall, 1997.

Huang, Schultheiss, "Block Quantization of Correlated Gaussian Random Variables," IEE Transactions of Comm. Systems, vol. 3, pp. 26-40, 1963.

Mitchell, J.L., W.B. Pennebaker, C.E. Fogg and D.J. Legall, MPEG Video Compression Standard, in Digital Multimedia Standards Series, Chapman & Hall, New York, NY, 1997.

Ramshandran, Ortega, Vetterli, "Bit Allocation for Dependent Qaulitization with Applications to Multiresolution and MPEG Video Coders," IEEE Trans. Image Processing, vol. 3, 1994.

Tao, Dickinson, Peterson, "Adaptive Model-Driven Bit Allocation for MPEG Video Coding," IEEE Trans. Circ. Sys. on Video Tech., vol. 10 No. 1.

Vetro, Sun, Wang, "MPEG-4 Rate Control for Multiple Video Objects," IEEE Trans. Circ. Sys. on Video Tech., vol. 9, pp. 186-199.

ISO-IEC/JTC1/SC29/WG11, MPEG93/457 (MPEG-2 Test Model 5, TM5).

ITU-T TMN5, TMN8 Rate Control Schemes.

Ding, W. and B. Liu, "Rate Control of MPEG Video Coding and Recording by Rate-Quantization Modeling," IEEE Trans. Circuits and Systems for Video Tech, Feb. 1996, pp. 12-20, vol. 6—No. 1.

Ramshandran, Ortega, Vetterli, "Bit Allocation for Dependent Qaulitization with Applications to Multiresolution and MPEG Video Coders," IEEE Trans. Image Processing, Sep. 1994, pp. 533-545, vol. 3—No. 5.

Tao, Bo et al., "Adaptive Model-Driven Bit Allocation for MPEG Video Coding," IEEE Transactions on Circuits and Systems for Video Technology, 2000, vol. 10—No. 1, pp. 147-157.

Vetro, Anthony, et al., "MPEG-4 Rate Control for Multiple Video Objects," IEEE Transactions on Circuits and Systems for Video Technology, Feb. 1999, pp. 186-199, vol. 9 No. 1.

Huang, J.J.Y and P.M. Schultheiss, "Block Quantization of Correlated Gaussian Random Variables," IEE Transactions on Communication Systems, 1963, pp. 289-296.

ISO-IEC/JTC1/SC29/WG11, "10 Rate Control and Quantization Control," MPEG2 Test Model 5 Draft, Apr. 1993, <http://www.mpeg.org/MPEG/MSSG/tm5/Ch10/Ch10.html>.

"Appendix III: Examples for H.263 Encoder/Decoder Implementations." ITU-T Recommendation H.263, Jun. 2001, TMN8 Rate Control Schemes pp. 18-20, 37-39 TMN5. International Telecommunication Union.

Park, Daechul et al.: "Buffered Rate-Distortion Control of MPEG Compressed Video Channel for DBS Applications." Communications—Gateway to Globalization. Seattle, Jun. 18-22, 1995, Proceedings of the Conference on Communications (ICC), New York, IEEE, US, vol. 3, Jun. 18, 1995, pp. 1751-1755, XP000535048; ISBN: 0-7903-2487-0.

\* cited by examiner

FIG-11 PRIOR ART

SYSTEM AND METHOD FOR OPTIMAL TRANSMISSION OF A MULTITUDE OF VIDEO PICTURES TO ONE OR MORE DESTINATIONS

BACKGROUND OF THE INVENTION

1. Field of the Invention

This invention relates to the transmission of compressed video signals and, more particularly, the optimal determination of a coded bit rate in a system where more than one coded video stream is multiplexed over a single, bandwidth limited data link.

2. Background of the Invention

Methods and systems that try to achieve the best possible perceived quality of a reconstructed video image under real-time constraints are known as Rate Control algorithms. Traditional Rate Control algorithms operate in a single video encoding process and optimize only with a single coded video stream. In contrast, this invention is concerned with algorithms that optimize multiple coded video streams simultaneously. This class of algorithms is called Multichannel Rate Control algorithms (MCRC-algorithms).

Two major classes of single channel rate control algorithms are also known. A first class is denoted as constant bit rate control algorithm (CBR). CBR algorithms try to assign a well-defined number of bits to each captured image during an encoding process. The second class is known as variable bit rate control algorithms (VBR). VBR algorithms keep the bit rate on average and within a well-defined variance, constant for several pictures. However, they allow for sometimes significant changes of the rate per individual pictures. This allows an encoder to react to big changes in the image characteristic by spending more bits for this change than for smaller changes, and, hence, often leads to a better perceived picture quality. A very early example of a rate control algorithm can be found in the publication Huang, Schultheiss, "Block Quantization of Correlated Gaussian Random Variables," *IEE Transactions of Comm. Systems*, vol. 3, pp 26-40, 1963). More recent examples of CBR are described in W. Ding and B. Liu, "Rate Control Of MPEG Video Coding And Recording By Rate-Quantization Modeling," *IEEE Trans. Circuits and Systems for Video Tech.* 6(1) (February 1996) pp. 12-20 and VBR are described in ISO-IEC/JTC1/SC29/WG11, MPEG2 Test model 5 Draft (April 1993).

CBR algorithms are generally preferred for low-delay operations over fixed bandwidth links. The common way to implement CBR algorithms in hybrid encoders is to adjust the quantization step size, commonly known as QP value. This numeral value directly influences the compression factor by removing precision in the rounding of the transform coefficients during the compression process. In most video compression systems (at least in those conforming to one of the popular video compression standards), the QP value is a property of a macroblock and typically has an integer numerical value within a small numeric numbering range, such as one to thirty-two. In this regard, the higher the QP value, the lower the quality of the picture, while the lower the QP value the higher the quality of the picture. Thus, the QP value is generally inversely related to the picture quality.

It is well known that the human visual system reacts unfavorably to abrupt changes in the picture quality and such changes are perceived as very annoying. Hence, most rate control algorithms try to employ an equal QP value for the whole picture, or allow only for slight variations of the QP value, thereby leveling the picture quality, and, hence, prevents abrupt quality changes. More sophisticated rate control algorithms sometimes take psycho-optical considerations into account and distinguish between "flat" and "active" sectors of the picture. They then attempt to code flat sectors in a lower quality than active sectors. A typical example of such an algorithm can be found in the European Patent Reference EP 1 250 012 A2.

Another technique that is somewhat related to the invention is known as load balancing. In general, load balancing techniques try to allocate multiple requests to multiple servers in such a way that the response time to the request is optimized. They are most commonly used in data transmission environments, for example, to distribute the load of the request to a popular website to a multitude of web servers. Load balancing algorithms commonly use linear optimization to optimize the transmission of data among a plurality of web servers, but these linear optimization techniques did not provide rate control for a plurality of streams from a video conference environment and/or environments.

Figure 11:
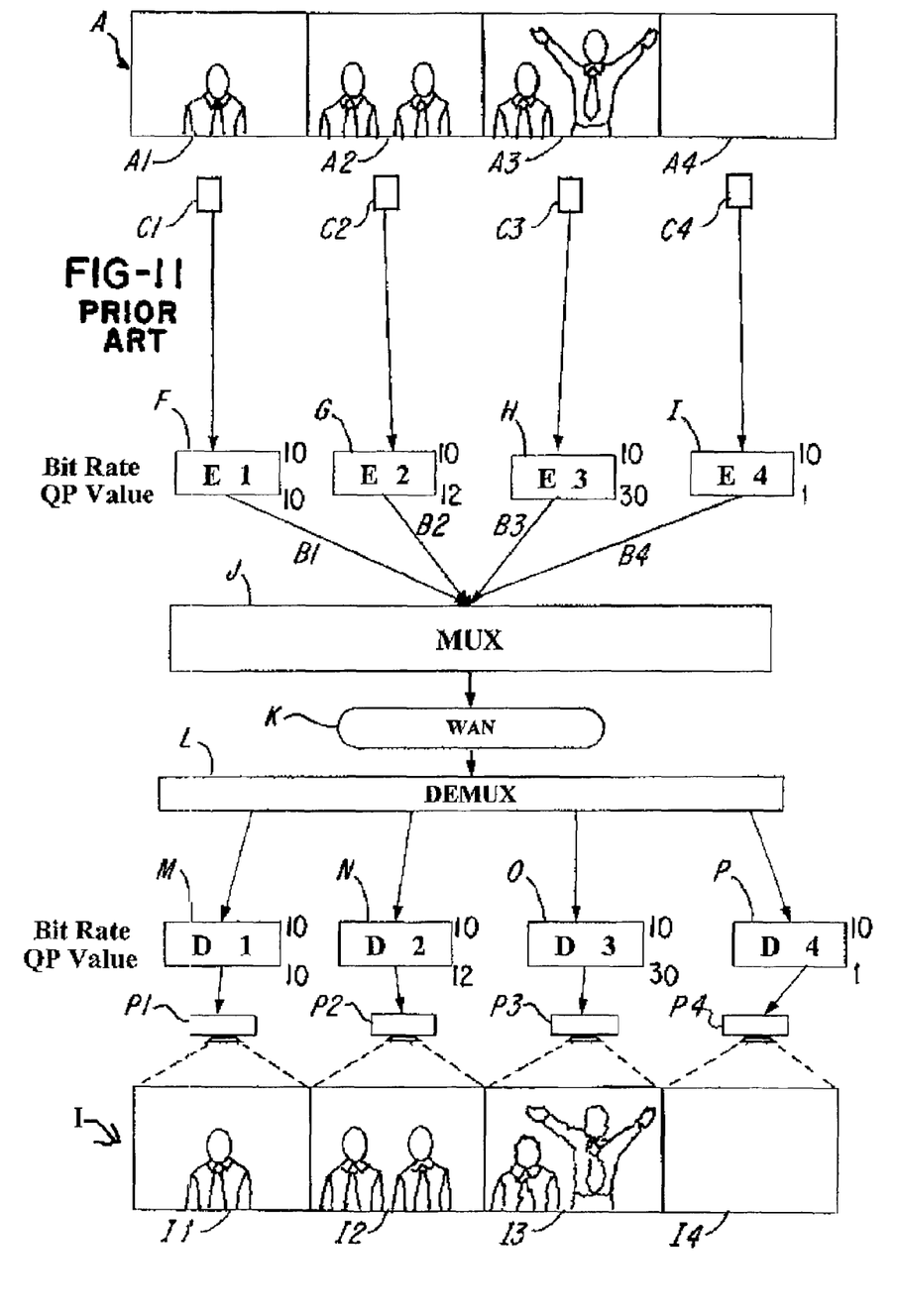
FIG. 11 is a view of a prior art system illustrating the varying quantization sizes that results in an inferior quality image.

FIG. 11 depicts a typical prior art, four screen videoconference system and environment known as a TeleSuite® room maintained by TeleSuite Corporation of Englewood, Ohio, and of the type shown and described in U.S. Pat. Nos. 5,572,248, 5,751,337, 6,160,573, and 6,445,405 which are incorporated herein by reference and made a part hereof.

A wide-band scene A, with an aspect ratio of 16:3, consists of four spatially adjacent sub-scenes A1, A2, A3, and A4. Many prior systems utilize video compression algorithms that generally conform to one of the generally accepted video compression standards, such as International Telecom Union (ITU) standards H.261 or H.263. For example, the H-261 standard was designed for data rates which are multiples of 64 kilobytes/second. Such standards often have established data rates and preferred picture formats, and although they may also support other formats, the widely deployed encoders/decoders (codecs) support only those standard formats. Hence, it is necessary to combine several cameras and several codecs to capture a wide-band scene and encode the wide-band scene by splitting it spatially into several sub-scenes, each of which with the size of one of the commonly supported picture formats of the video codecs.

Referring to FIG. 11, note that each sub-scene is captured by the associated camera, C1, C2, C3, and C4. The sub-scenes in the depicted example are described as follows: A1 shows a single sitting person's upper body, A2 shows two sitting persons' upper bodies, A3 shows two sitting persons' upper bodies, one of which is in the process of getting up and gesticulating, and A4 shows a static background.

The video outputs of the cameras C1 to C4, each carrying the analog representation of the sub-scenes A1 to A4, are converted by the video encoders E1 to E4 into compressed, digital video bit streams B1 to B4, respectively, preferably conforming to one of the ITU video compression standards, such as H.261 or H263. In one environment, all encoders E1 to E4 (labeled F-1 in FIG. 11) are configured to utilize the same bit rate, namely, 10 kbit/s in the example depicted in FIG. 11. Hence, the resulting bit rate used in transmission over a local or wide area network (WAN) is 4×10 kbit/s=40 kbit/s. Since the sub-scenes vary in their activity, but the encoder bit rates are constant, the quality of the coded sub-scenes, as indicated by the QP value also varies. Encoder E1, which encodes a moderately active sub-scene, operates at a good quality level with a QP value of 10. Encoder E2, with a slightly more active sub-scene than E1, cannot achieve the same quality within the bit rate constraints and operates at a QP value of 12. Encoder E3, coding the extremely active sub-scene A3, operates at a QP value of 30 and produces a coded image of very low quality. Encoder E4, which codes the static background sub-scene A4, operates at the best possible quality level with a QP of 1.

All streams are multiplexed together in a multiplex unit J to form an outgoing data stream. The data stream is conveyed over a local or wide area network (WAN) K to the receiving room. Here, the received multiplexed data stream is de-multiplexed by a demultiplexer L to reconstruct the original four compressed, digital video bit streams. The bit streams are conveyed to the decoders D1 to D4, each of which reconstructs a video sub-image. These sub-images are made visible using the attached displays or data projectors P1 to P4. The projector beam directions of all projectors P1 to P4 are arranged in such a way that the four displayed sub-images I1 to I4 spatially compose a full image I that geometrically resembles the captured scene A.

Each encoder E1 to E4 has a set of defined and fixed parameters and generates a bit stream in compliance with these parameters. The most prominent of these parameters is the target bit rate. Typically, each encoder E1 to E4 uses a CBR algorithm to achieve the best possible picture quality when coding the captured scene. When using multiple encoders, each encoder operates at a certain predetermined bit rate. Normally, all encoders are configured to use the same bit rate, because at the configuration time the characteristics of the sub-scenes to be captured are not yet known.

Since the bit rate for each sub-scene is fixed, the quality level of the coded sub-picture varies with the activity captured by the camera. A static background, for example the one of the sub-scene A4, is coded at a very high quality in order to utilize the configured bit rate. A highly active sub-scene, for example the one of the sub-scene A3, yields an unfavorably low picture quality. After transmission and reconstruction, the complete broad-band image I suffers not only from an unpleasantly low quality sub-image I3, but also from an annoying quality change between the sub-images I3 and I4.

When displaying a wide-band image comprised of a plurality of sub-images displayed side-by-side, it is desirable to have the displayed images be the same quality so they do not annoy the human visual system through abrupt quality changes. However, when a multitude of images are transmitted and displayed in a room, and if all transmitted images use the same transmission bandwidth (as is common in the prior art), it is not uncommon that one or more of the displayed images will be coded at a different quality level compared to the neighboring sub-picture (by using average QP values that are different).

What is needed, therefore, is a system and method which adjusts the image quality across a plurality of sub-pictures simultaneously and in real-time in order to achieve a high perceived image quality across the entire composite or broadband image comprised of the multiple sub-images for those viewing the plurality of sub-images that make up the image.

What is further needed is a system and method which adjusts the picture quality for each of a plurality of images that comprise a picture and that distributes or balances the transmission of the plurality of images in order to optimize the overall picture quality in a video transmission system.

SUMMARY OF THE INVENTION

Advantageously, a system and method are provided for the optimal transmission of a multitude of video pictures consists of n video encoders E(n), whereby n is bigger than one, which translate incoming pictures, preferably from video sources such as cameras, and preferably at a fixed picture rate, to a sequence of bits that form the coded representations of the incoming pictures, thereby compressing them. Each picture is transmitted as an independent bit stream. The compression is not loss-less, and preferably follows the principle of a hybrid coder. Every video encoder E(n) is capable to report the distortion that results from the lossily compression at any given time as D(n). D(n) may be calculated in the form of a Peak Signal-to-Noise Ratio (PSNR), Sum of Square Difference (SSD), Sum of Absolute Difference (SAD) or any other appropriate means. D(n) may also be heuristically determined, e.g. by using the average quantizer factor of the coded video as a quality indication. Every video encoder E(n) is furthermore capable of keeping the number of bits for each coded picture, multiplied by the picture rate, below a maximum number of bits provided externally, the bit rate R(n). The complete system of n encoders E(n) is furthermore bound to a maximum target bit rate T, hence $T \geq \Sigma R(n)$. That is, at any given point in time, the target bit rate T must not be larger than the sum of all encoder bit rates R(n). The system for the optimal transmission of a multitude of video pictures adjusts the encoder bit rate R(n) for each encoder, in fixed time intervals (such as integer multiplies of the frame interval), variable time intervals (e.g., whenever sufficient processing power is available), or triggered by the input of an user interface, in such a way that the distortion D(n) for all encoders is equalized. It does so by performing a linear optimization of R(n).

In one aspect, this invention comprises a system consisting of a plurality of video encoders, each of which lossily compresses a sequence of video pictures to a bit stream of a provided rate and resulting in an achieved quality that is optimized by adapting the target bit rate of each encoder individually.

In another aspect, this invention comprises a method for improving the quality of a video application with real-time encoding, comprising the steps of coding a first plurality of images that were acquired at substantially the same time, using a target bit rate, measuring a plurality of actual bit rates for a plurality of encoders for the first plurality of images, respectively, measuring a plurality of distortion values for each of the plurality of encoders, respectively, and calculating a plurality of adjusted target bit rates to be used by the plurality of encoders for a second plurality of images, respectively, such that a second plurality of distortion values for the plurality of encoders used to encode the second plurality of images will be substantially the same.

In yet another aspect, this invention comprises a method for a optimal transmission of a plurality of pictures to one or more destinations, comprising the steps of providing a plurality of encoders, each of which contains a rate control algorithm that adjusts a quality of a picture coded by each of the plurality of encoders so that a target bit rate for the coded picture does not exceed a predetermined amount using each of the plurality of encoders to lossily compress a plurality of sequences, respectively, of a plurality of bit streams of a plurality of target bit rates which results in a plurality of achieved qualities, the plurality of achieved qualities being optimized by adapting the plurality of target bit rates of each of the plurality of encoders individually measuring the plurality of achieved qualities, optimizing the quality of all of the plurality of pictures coded by the plurality of encoders by adjusting the target bit rates of each of the plurality of encoders in such a way that the plurality of qualities of all of the plurality of pictures is substantially the same.

In still another aspect, this invention comprises a system for the optimal transmission of a plurality of pictures to one or more destinations, including a plurality of video sources for capturing the plurality of pictures, a plurality of encoders, each of which follows the principle of a hybrid coder, employs rate control, and is capable of reporting an achieved picture quality in a time interval between a last report and a request to a bit rate control manager, and the bit rate control manager being coupled to each of the plurality of encoders that determines a target bit rate for each of the plurality of encoders, wherein the bit rate control manager, determines the target bit rate for each of the plurality of encoders so that an individual quality of all pictures coded by the plurality of encoders is optimized in such a way that the achieved quality of all pictures is substantially the same.

In yet another aspect, this invention comprises a video conferencing system, comprising, a plurality of cameras in a first station that capture a spatially adjacent scene, an encoding system that compresses, transmits, and de-compresses a plurality of pictures from the plurality of cameras respectively, and generates a plurality of reconstructed pictures in at least one receiving station(s), the encoding system comprising a bit rate control manager coupled to each of the plurality of encoders for determining a bit rate for each of the plurality of encoders such that a quality of the reproduced bit stream produced by each of the plurality of encoders is substantially the same, a plurality of display devices in the receiving stations whose display fields are spatially adjacent so that they are capable of rendering the scene as captured in the sending station.

Other objects and advantages of the invention will be apparent from the following description, the accompanying drawings and the appended claims.

DETAILED DESCRIPTION OF PREFERRED EMBODIMENT

The invention is preferably used as part of a high-quality video conferencing system, but may also have other applications (such as the parallelization and segmentation of picture coding for very high resolution video). One typical system is shown in the U.S. Pat. Nos. 5,751,337; 5,751,337; 6,160,573; and 6,445,405, which are assigned to the same assignee as the present invention and which are incorporated herein by reference and made a part hereof.

Referring to FIGS. 1-10 a system and method illustrating the invention is shown. In contrast to the prior art, this system and method adjusts both the bit rate and the QP values optimally. For ease of illustration, the WAN bit rate will be assumed to be 40 kbit/s, but it could be another rate if desired, so long as the rate is at least as great as the bit rate from encoders En1-En4, labeled as 12-18, respectively. As will be described in detail later, the bit rates of each of the sub-scenes are adjusted so that the resulting average QP is identical for all four encoders. Note, however, that the bit rates are dramatically different in the illustration. Encoder E1 uses 8 kbit/s in FIG. 1 to encode its moderately active sub-scene. Encoder E2 employs a slightly more active sub-scene 10 kbit/s. The extremely active sub-scene of encoder E3 requires 21 kbit/s to be coded with the same average QP, whereas the static background sub-scene of E4 requires only 1 kbit/s. As will be seen, by using MCRC and taking advantage of the resulting dynamic bit rate allocation, all four sub-scenes are coded at the same average QP (12 in the illustration shown in FIG. 1), hence at the same quality level. Also, it should be understood that the invention permits a plurality of encoders to "talk" to each other and communicate their current quality or QP value as determined by their internal CBR rate control algorithm resident in each encoder. In one embodiment of this invention described later herein, the average quantization factor or QP value of all macroblocks is also used heuristically as an indication of the quality of one of the coded pictures that are optimized by the MCRC algorithm. Note that the average QP is calculated by adding all QP values of all macroblocks belonging to the coded picture, and dividing it by the number of macroblocks in the coded picture.

Figure 1:
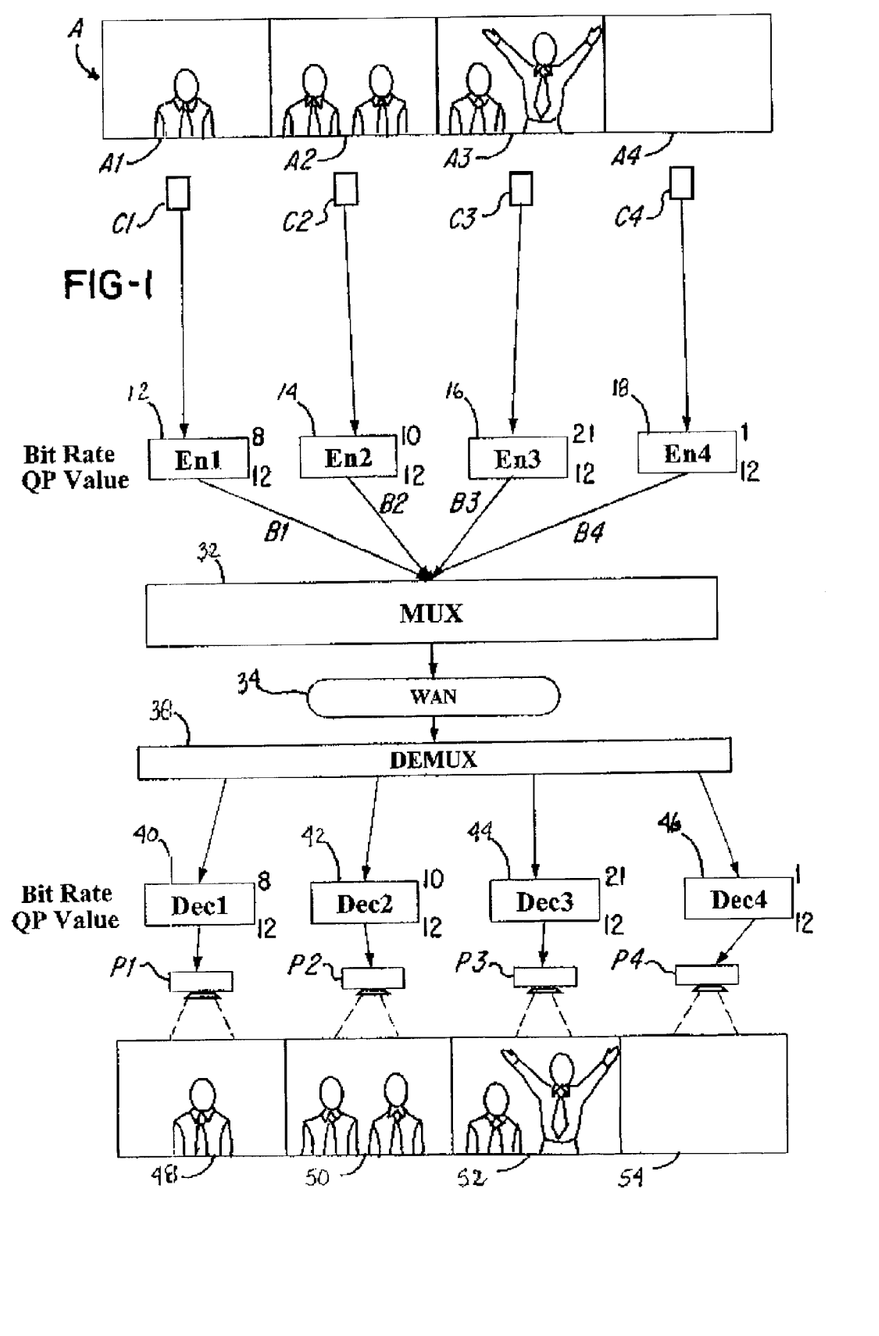
FIG. 1 is a schematic view illustrating an embodiment of the invention.
Figure 2:
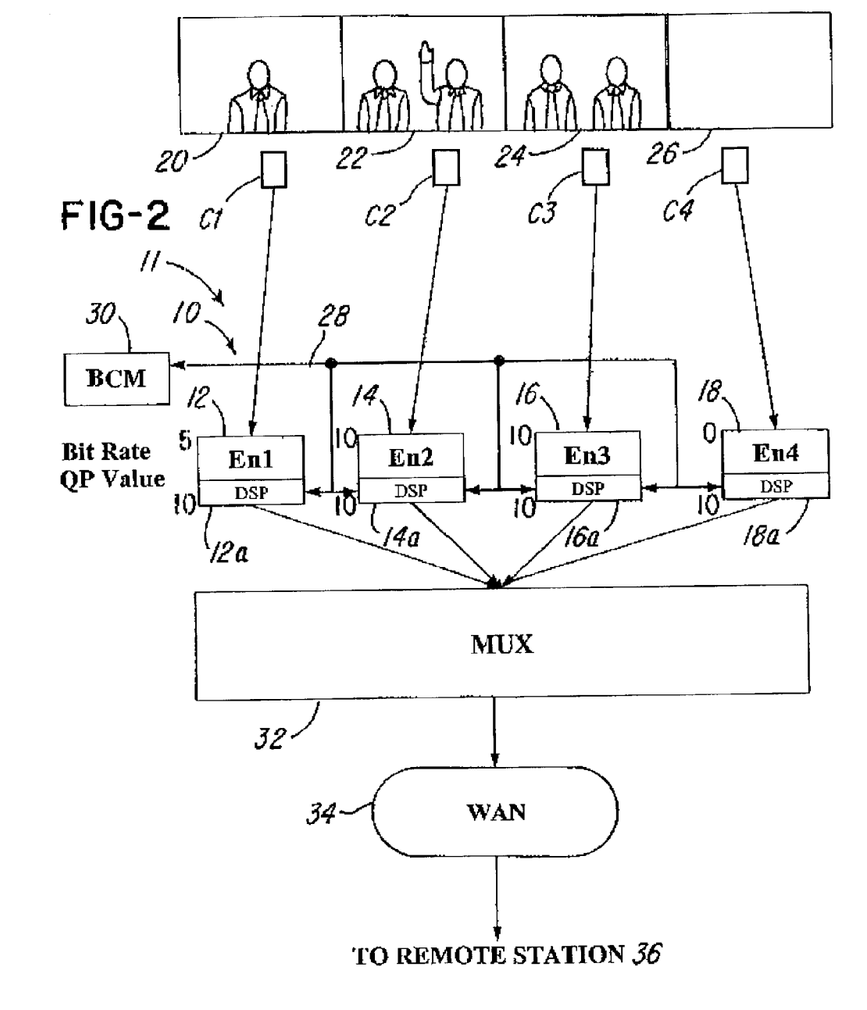
FIG. 2 is another schematic view of a first station.
Figure 3:
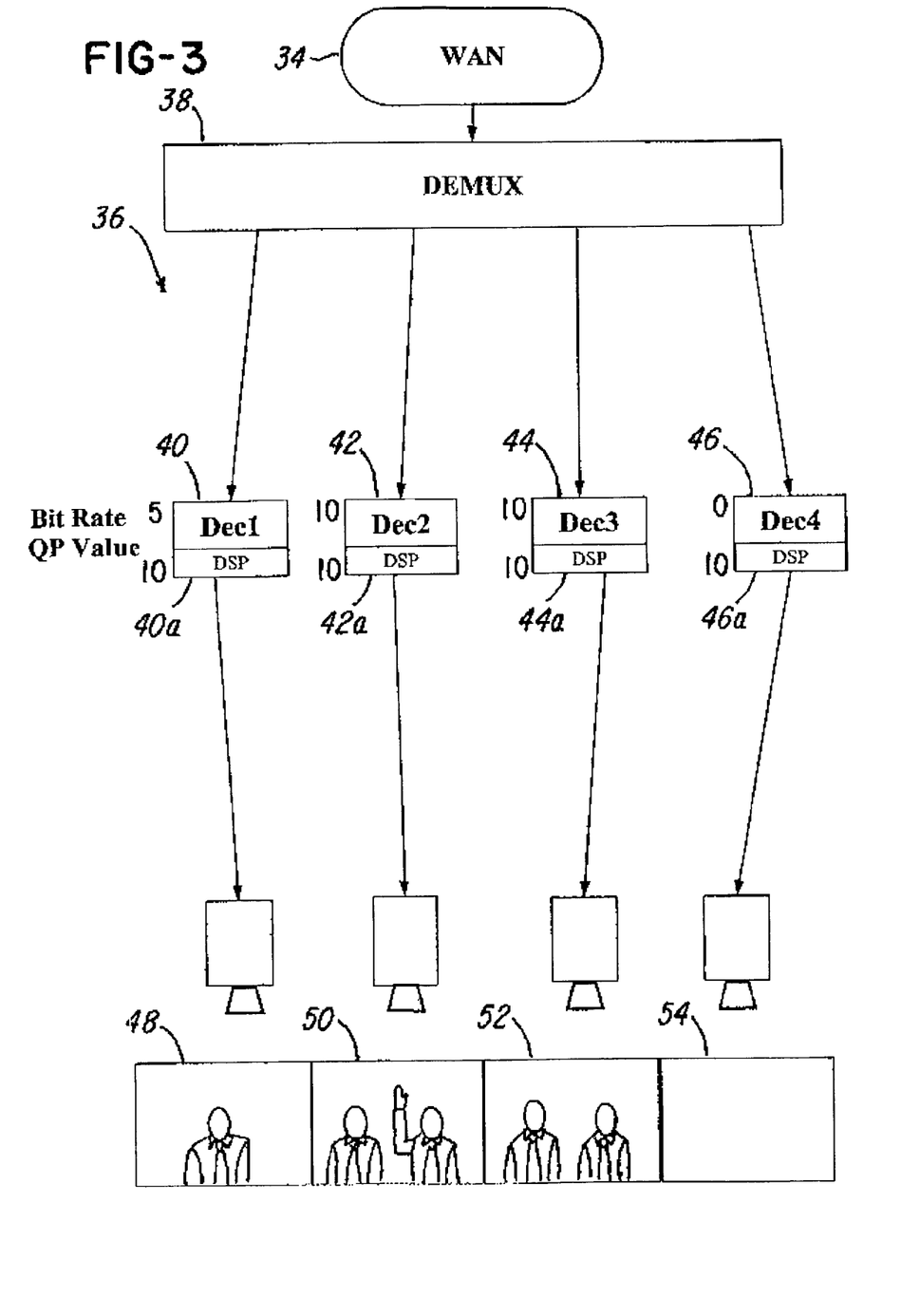
FIG. 3 is a schematic view of a second or remote station.

FIGS. 2-3 are another illustration of the system 10 in accordance with one embodiment of the invention that will now be described in more detail. In this embodiment, a plurality of encoders 12, 14, 16 and 18 each comprise a digital signal processor (DSP) 12a, 14a, 16a and 18a, respectively. In the embodiment being described, each DSP 12a-18a share a common control bus, such as a compact PCI bus, which is utilized to convey control information between and among the DSPs 12a-18a.

A plurality of cameras C1, C2, C3 and C4 capture individual images 20, 22, 24 and 26 and sends the data associated with the images 20-26 to the encoders (En1-En4) 12-18, respectively. The method for the transmission of the video images can either be by the means of an analog or digital connection. The DSPs 12a-8a each comprise Bit Rate Control Manager process (BCM), schematically illustrated as block 30 in FIG. 2, which receives a QP value for each encoder En1-En4 and actual bit rate for each image captured by cameras C1-C4, respectively, and generates a new bit rate for each encoder in the manner described later herein. The bit streams (with bit rates as determined by the BCM 30) are then multiplexed with a multiplexer 32 and distributed over a wide area network 34 to a remote station 36.

FIG. 3 illustrates the receiving or remote station 36. The multiplex signal is received over network 34 and received by demultiplexer 38 which demultiplexes the signal into four bit streams in the illustration. The four bit streams are received by a plurality of decoders DEC1 40, DEC2 42, DEC3 44 and DEC4 46 each having an associated digital signal processor 40a, 42a, 44a and 46a, respectively. For ease of illustration and understanding, the invention is described using encoders En1-En4 12-18 and decoders DEC1-DEC4 40-46, but it should be understood that a fewer or greater number can be used, provided there is more than just one. Also, the invention can be used in a combined integrated unit encoder/decoder commonly known as "codecs." For example, it should be understood that while the remote station is capable of receiving captured images from the first station 11 illustrated in FIG. 2, the typical video conferencing environment will also permit images to be captured at the remote station 36 for transmission back to the first station 11.

It should be understood that the bit rate corresponds to the bit rate corresponding to the images captured at the first station 11. Moreover, note that the QP value for each of the captured images 48, 50, 52 and 54 is identical because it is a part of the bit stream itself. In the illustration being shown in FIGS. 2 and 3, the QP value of the images 48-54 displayed is illustrated as being 10, and the bit rates are 5 kbit/s for En1, 10 kbit/s for Enc2, 10 kbits for En3, and 0 kbit/s for En4.

Referring to FIG. 2, it should be understood that each of the cameras C1, C2, C3 and C4 are coupled to each digital signal processor (DSP) 12a, 14a, 16a, and 18a. It should be further understood, however, that the cameras C1-C4 are synchronized in time by externally providing a horizontal and vertical synchronization signal and pixel clock in order to simplify the synchronization of the rate control algorithm used by the DSPs 12a, 14a, 16a and 18a. For example, during each vertical synchronization blanking period and utilizing the common control bus 28, all digital signal processors 12a-18a communicate to each other the target bit rate that was used when coding the last picture captured by the cameras C1-C4, respectively. The DSPs 12a-18a also communicate to each other the achieved quality in the form of the average QP value for that last picture captured by cameras C1-C4. After each bit rate value and QP value are received by the BCM 30 from all DSPs 12a-18a, each digital signal processor 12a-18a runs an identical algorithm in order to calculate the next target bit rate. This target or new bit rate is used in the encoding step of the next picture captured by its respective camera C1-C4, as the rate control parameter. Using the newly determined bit rate, the system and method of the invention cause the average QP value to be substantially the same, thereby insuring a substantially identical quality of the pictures that make up the broadband image. This process continues during the lifetime of a video conference so that the quality of the broadband image displayed at the station 36 (FIG. 3) is of the best possible quality that the bandwidth of the network 34 and various components of the system 10 will allow. Note that the average QP is calculated by adding all QP values of all macroblocks belonging to the coded picture, and dividing it by the number of macroblocks in the coded picture. Note also, that the calculation of the new target bit rate can also be performed for a plurality of macroblocks while coding a picture, an entity called a slice in many video compression standards. Doing so, the accuracy of the method and system can be higher, but the computational demands are lower. It is also possible to increase the time interval between the calculations of the new target bit rate to a multitude of the inverse of the frame rate. In this case, the computational demands are lower. The quality measurement such as in the form of the average QP, is always performed using all those macroblocks that were coded in the time interval between the last calculation and the current calculation.

In order to ensure that all encoders 12-18 (FIG. 2) operate using substantially the same QP value, the following formulas and algorithms are utilized by the DSPs 12a-18a:

$$R(n) = \frac{T}{n} \quad (1)$$

$$R_{temp}(n) = R_{prev}(n) + rate\left(\frac{\sum_{i=0}^{n} D_{prev}(i)}{n} - D_{prev}(n)\right) \quad (2)$$

$$R(n) = T \frac{R_{temp}(n)}{\sum_{i=0}^{n} R_{temp}(n)} \quad (3)$$

After the initialization according to formula (1), each encoder 12-18 generates a new bit rate used in the encoding step of the next picture captured by the encoders 12-18 respective cameras C1-C4, respectively, by applying the formulas (2) and (3). The new encoder rates are determined or calculated in accordance with the formulas (2)-(3). It should be understood that the time period for calculating the new bit rate can be as short as the inverse of a frame rate associated with the cameras C1-C4.

The formulas (2)-(3) calculate a new bit rate R(n) for each encoder 12a-18a by determining a difference between the average distortion of all pictures captured by the cameras C1-C4 and the distortion of the actual picture (Dprev(n)). This difference is weighted by a function rate, referred to as "rate" in formula (2), to calculate a bit rate difference that compensates for the difference in distortion for the images captured. Note that an Rtemp value for each of the encoders 12-18 is obtained by applying the formula (2) and normalized by applying formula (3) such that the sum of all R(n) yield a target bit rate T.

The compression is not loss-less, and preferably follows the principle of a hybrid coder. Every video encoder E(n) is capable to report the distortion that results from the lossily compression at any given time as D(n). D(n) may be calculated in the form of a Peak Signal-to-Noise Ratio (PSNR), Sum of Square Difference (SSD), Sum of Absolute Difference (SAD) or any other appropriate means. D(n) may also be heuristically determined, e.g. by using the average quantizer factor of the coded video as a quality indication. Every video encoder E(n) is furthermore capable of keeping the number of bits for each coded picture, multiplied by the picture rate, below a maximum number of bits provided externally, the bit rate R(n). The complete system of n encoders E(n) is furthermore bound to a maximum target bit rate, T, hence T≧ΣR(n). That is, at any given point in time, the target bit rate T must not be larger than the sum of all encoder bit rates R(n). The system for the optimal transmission of a multitude of video pictures adjusts the encoder bit rate R(n) for each encoder, in fixed time intervals (such as integer multiplies of the frame interval), variable time intervals (e.g., whenever sufficient processing power is available), or triggered by the input of an user interface, in such a way that the distortion D(n) for all encoders is equalized. It does so by performing a linear optimization of R(n).

It should be understood that the second step is unnecessary if the function rate always generates a mathematically correct result, assuming a constant average activity in all pictures, which would suggest that normalization is not necessary. However, in a typical video conferencing environment that comprises multiple cameras C1-C4, it is common that the distortion will vary from image to image and the average bit rate activity of all pictures is not constant, for example, when a bit rate value for one image captured varies or suddenly becomes more active. As is apparent, the function rate R(n) is highly dependent on the content of the images captured by cameras C1-C4. It should be appreciated, however, that typically, the function rate will be a content-adaptive function, thereby allowing an appropriate adaptation to changing picture content. Implementation of the rate function may be conventionally performed utilizing, for example, techniques described in Mitchell, J. L., W. B. Pennebaker, C. E. Fogg and D. J. LeGall, "MPEG Video Compression Standard", in Digital Multimedia Standards Series, Chapman & Hall, New York, N.Y., 1997; and Haskell, B. G., A. Puri and A. N. Netravali, "Digital Video: An Introduction to MPEG-2," ISBN: 0-412-08411-2, Chapman & Hall, 1997, which is incorporated herein by reference and made a part hereof.

Figure 10:
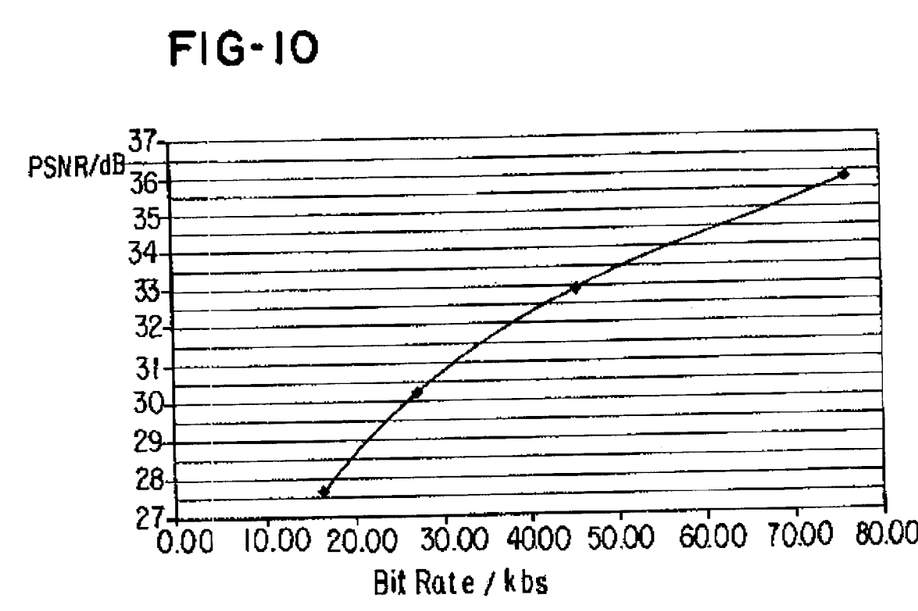
FIG. 10 is a graph illustrating a rate distortion curve.

The number of additional bits required to achieve a desired quality level across the images 48-54 (FIG. 3) varies not only with the video compression technology employed by the encoders 12-18, but also with the content of the captured images 20-26 to be coded by the encoders 12-18, respectively. In a simplistic implementation, the function rate can be derived from rate-distortion curves generated by content similar to the content of the images to be captured by the cameras C1-C4 and the video compression algorithms employed by the encoders 12-18. FIG. 10 illustrates a rate-distortion curve that shows a gradual increase in distortion as the bit rate increases from, for example, approximately 15 Kbps to approximately 75 Kbps. The relationship of the quality level, indicated as an peak signal noise-ration (PSNR) value (measured in dB) in the rate-distortion curve, and the QP value depends on the coded content and on the video coding standard employed, and does not need to be further discussed here.

Figure 4:
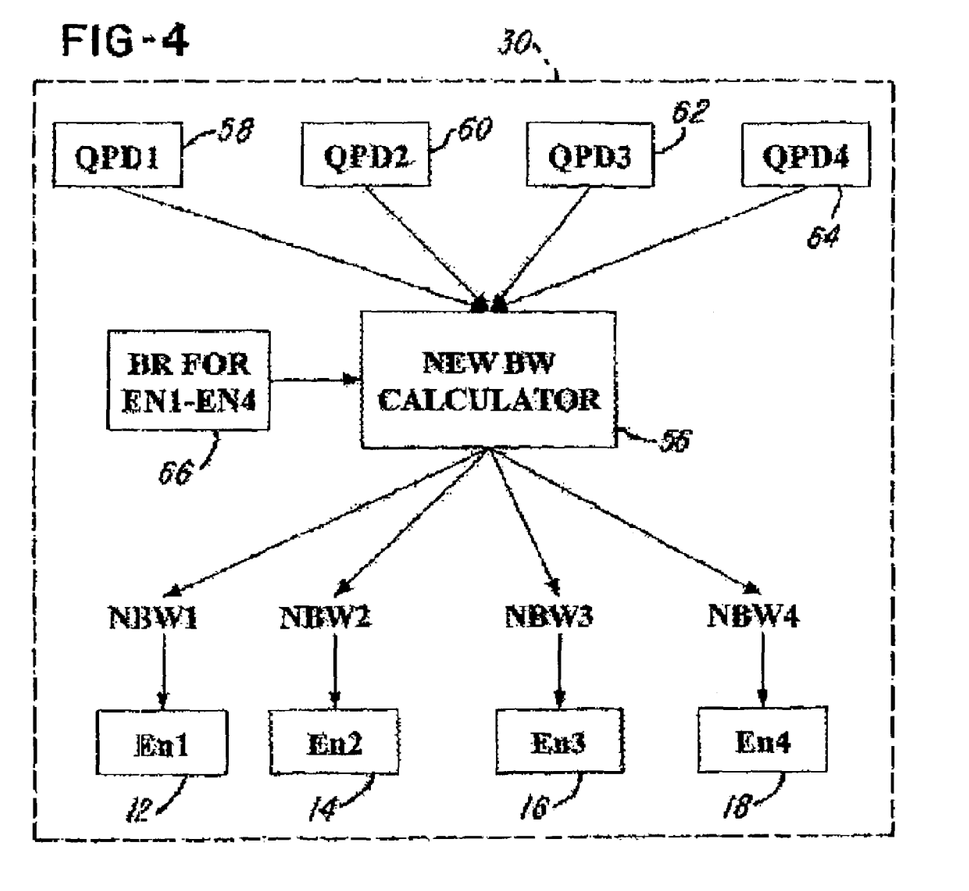
FIG. 4 is a schematic view of bit rate control manager in accordance with one embodiment of the invention.
Figure 5:
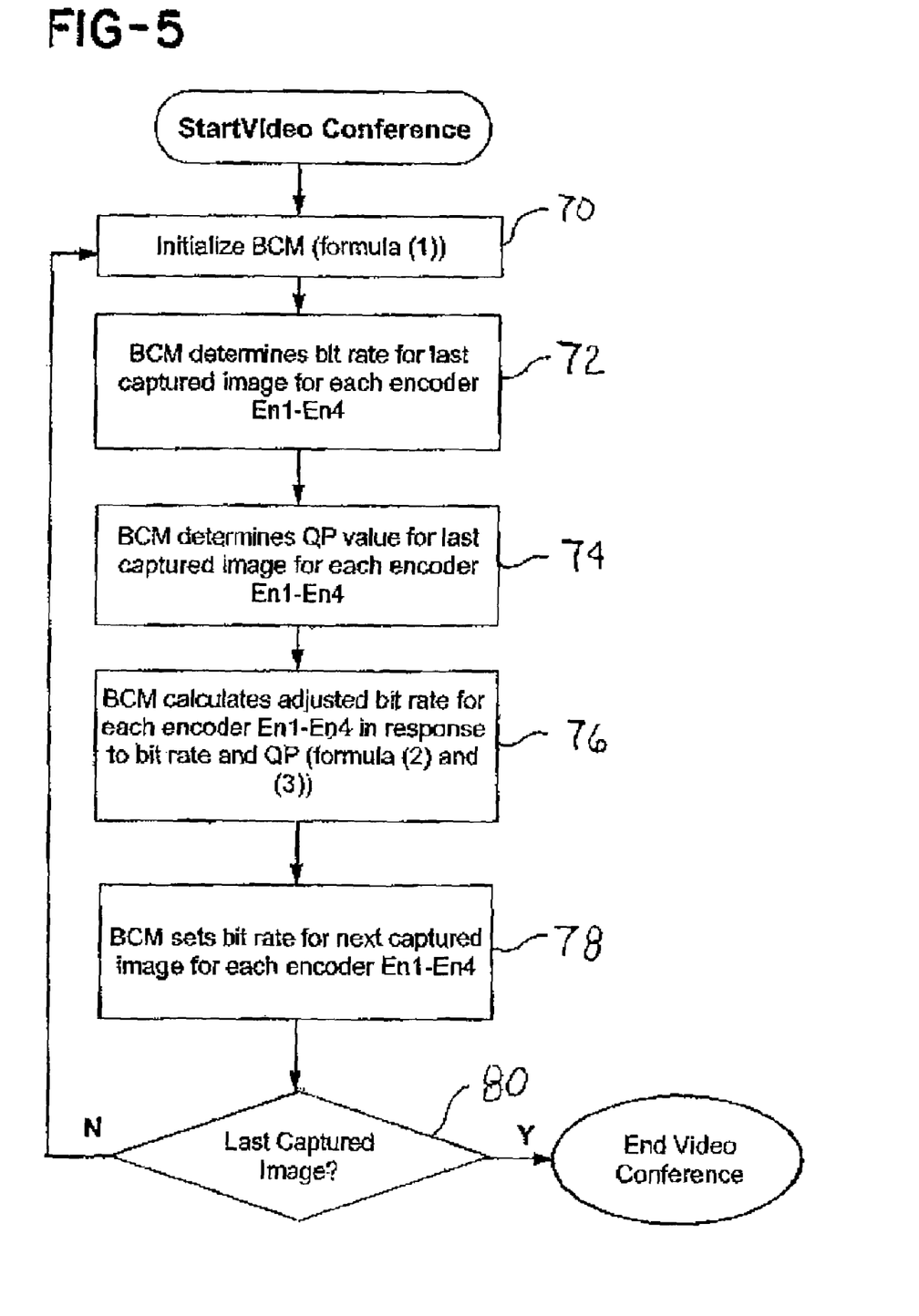
FIG. 5 is a flow diagram of a process according to one aspect of the invention.

Referring to FIGS. 4 and 5, one embodiment of the Bit rate Control Manager (BCM) 30 for use on the digital signal processors 12a-18a is shown. As illustrated, the BCM 30 comprises a new bit rate calculator 56 that receives a QP value 58, 60, 62 and 64 from each of the plurality of encoders 12-18, respectively. The actual bit rate from the previously image from cameras C1-C4, represented schematically by block 66, is also received by the bit rate calculator 56. Applying the aforementioned formulas (1)-(3), the BCM 30 calculates a new bit rate NBW1-NBW4 or target T, that is received by the digital signal processors 12a-18a of encoders 12-18, respectively. The new bit rate is used for the next set of images captured by cameras C1-C4. The current bit rates are used by digital signal processors 12a-18a as parameters into the (CBR) rate control algorithms resident on and utilized by the En1-En4 12-18. This new target bit rate, if calculated correctly, forces the QP value generated by the encoders 12-18 to be substantially the same, thereby insuring image quality for all images to be substantially the same when they are displayed, for example, side-by-side.

Referring now to FIG. 5, a process and method of the invention begins at Block 70 where a video conference is initiated. During the initialization, before the first picture is coded, the BCM is initialized by applying formula (1). At block 72, the BCM 30 determines the bit rate for the last captured image for each of the encoders 12-18. The BCM 30 then determines a QP value for the last captured image for each of the encoders 12-18 (block 74) and thereafter calculates an adjusted bit rate for each encoder 12-18 (block 76) in response to the bit rate received for each encoder 12-18 (block 66 in FIG. 4) and the QP values 58-64. At block 78, the BCM 30 sets the bit rate for the next captured image for each encoder 12-18. At decision block 80, it is determined whether the data received by the BCM 30 is the data associated with the last image captured by the plurality of cameras C1-C4. If it is, then the video conference ends (block 82 in FIG. 5), but if it is not, then the routine loops back to block 72 where the data and bit rate for the next captured image can be processed as shown.

Figure 6:
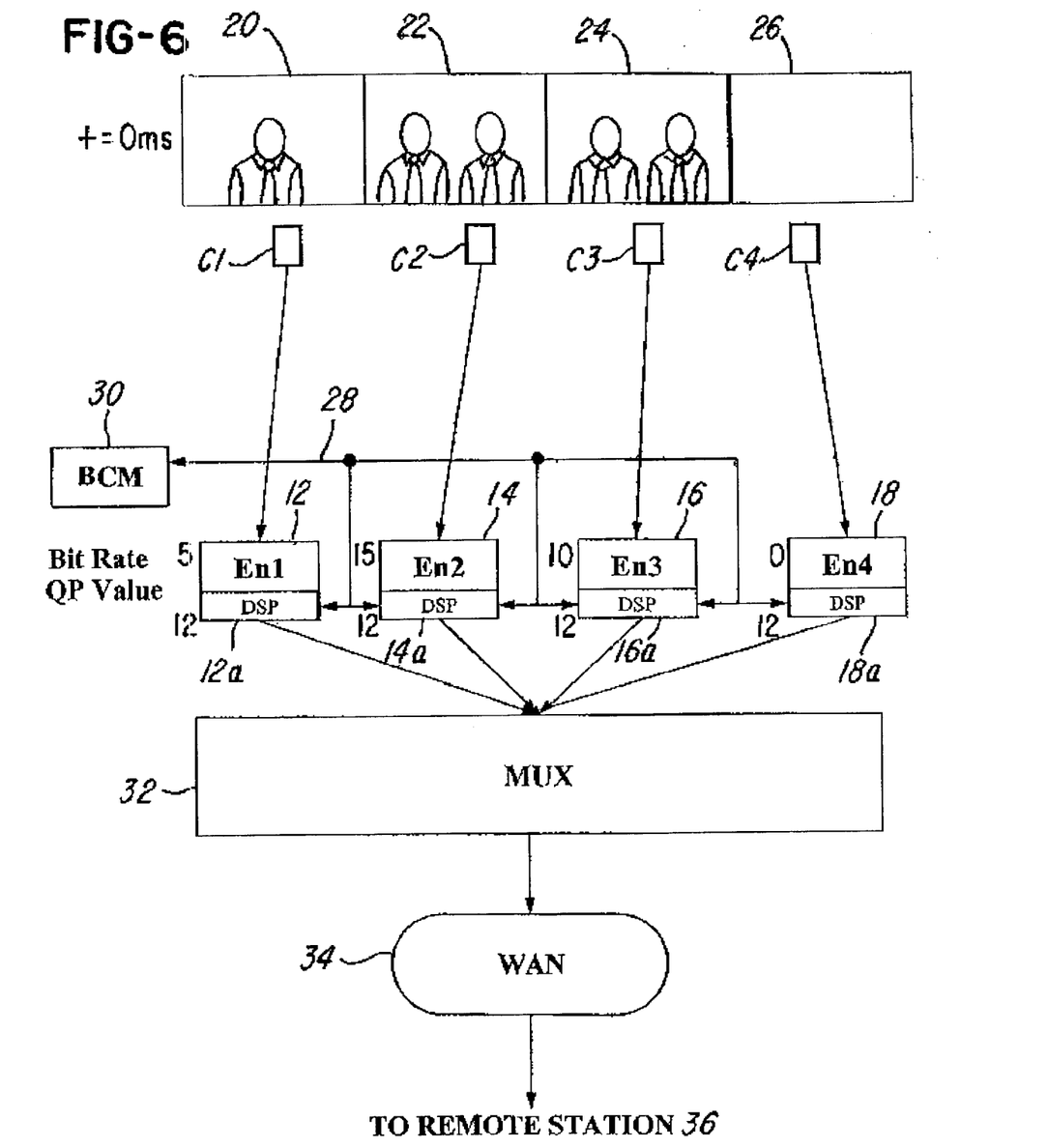
FIG. 6 is a view illustrating further features of the invention.
Figure 7:
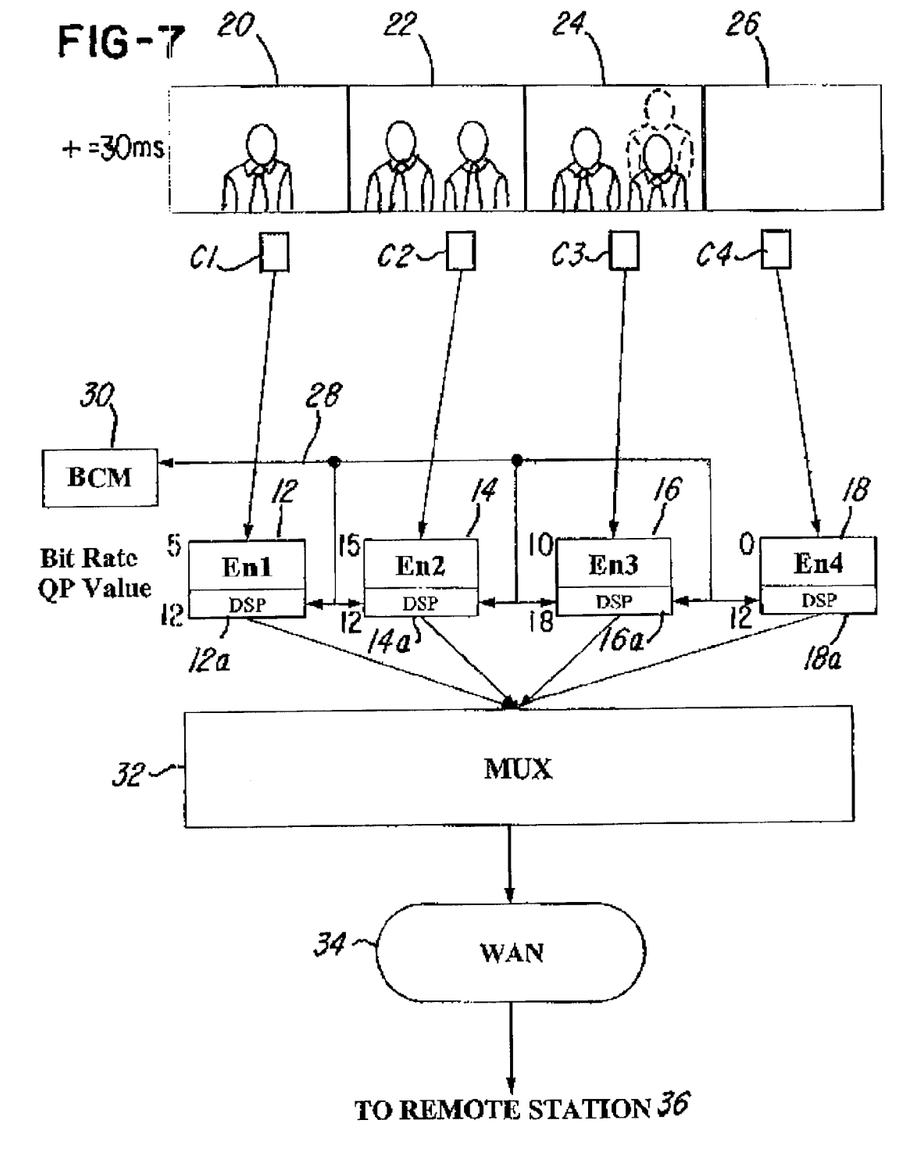
FIG. 7 is another view illustrating a first set of bit rates and quantization values.
Figure 8:
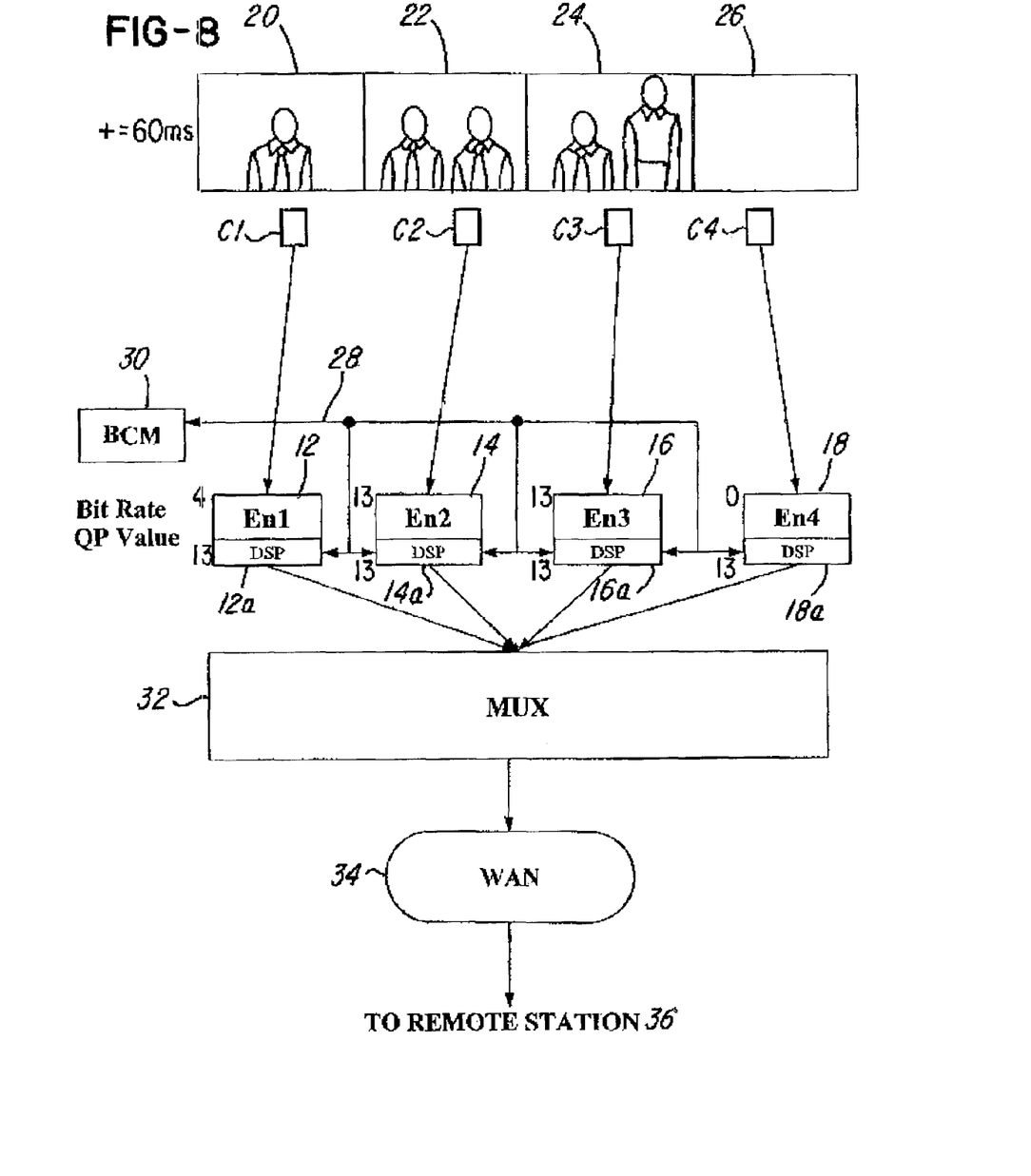
FIG. 8 is a view similar to FIG. 7 but later in time showing another frame of bit rates and quantization values after utilizing features of the invention.

The system and method of the present invention are further illustrated by FIGS. 6-8 and associated description. For ease of illustration, it should be appreciated that the images captured by cameras C1, C2 and C4 are presumed to be unchanged (i.e., the subjects do not move) during the conference, while the bit rate associated with the image captured by camera C3 changes in that the participant or person seated in the right hand side of the frame capture of image (i.e., frame 24 in FIG. 6) changes because the participant in the right side (as viewed in FIG. 6) of Frame 24 moves from a seated position to a standing position with arms outstretched. As illustrated in FIG. 6, the cameras C1-C4 capture the illustrated images and encoders 12-18 generate an associated bit rate of 5 Kbps, 15 Kbps, 10 Kbps and 0 Kbps, respectively. These values are received by the digital signal processor 12a of encoders 12-18, respectively. It should be appreciated that the images captured and for ease of illustration are assumed to be the "last captured image" (as referred to at Block 72 in FIG. 5). In the illustration being described, it will also be assumed that the time equals zero milliseconds or the beginning of a video conference in FIG. 6. Note in the illustration shown in FIG. 6 substantially no change in the bit rate has occurred because the images in the captured frames 20-26 have not changed as a result of movement or new bit rate associate with the frames 20-26. Consequently, the digital signal processors 12a-18a of encoders 12-18, respectively, receive the bit rates and, using the rate control algorithms and in the manner described earlier herein relative to FIGS. 4 and 5, calculate a new bit rate value that is substantially the same, namely 12 in the example being described.

Note, however, the change in the bit rate as the participant in frame 24 stands from a seated position to a standing position, as shown in FIG. 7. The bit rate calculator 56 of BCM 30 (FIG. 4) receives the QP value for each encoder 12-18, using bit rates for the last captured image (i.e., 5, 15, 10 and 0) (block 74). Note, however, that the QP value required by the rate control algorithms has changed dramatically in that the QP values for the encoders 12-18 is 10, 10, 18 and 10, respectively. This means that while the quality of the images for the data displayed at the remote station 36 will generally be improved for data coded by encoders 12, 14 and 18, the quality of the image displayed at the remote station 36 from data encoded by encoder 16 is substantially reduced, resulting in a quantization difference of 8 (18-10) in the QP value. Thus, when the wide-band image comprised of all the images 48-54 are displayed and adjacent to each, the image displayed or projected in the third frame is substantially inferior to the other three frames. This result is typical to what was described earlier relative to the prior art. In the system and method of the present invention, the QP value discrepancy exists for only milliseconds so it is imperceptible to the naked eye of a human being and is accounted for as follows.

When the next uncoded pictures from cameras C1-C4 are processed by the encoders 12-18, DSPs 12a-18a receive the uncoded pictures and process them in accordance with the invention and utilizing the formulas (1)-(3) and the algorithm illustrated in FIG. 5 to calculate a new target bit rate that will force the QP value from each encoder EN1-EN4 to be substantially the same. In the illustration being described, when the time equals 60 milliseconds, as illustrated in FIG. 8, the bit rate determiner 30 calculates a new bit rate for each encoder EN1-EN4 for the next set of data so that the QP value will be substantially the same (13 in the example being described). Consequently, the system and method of the present invention generate a new distribution of bandwidth to each encoder by generating a new bit rate for each encoder 12-18 so that the QP values associated with the data coded by the encoders 12-18 is substantially the same when it is transmitted for display at the remote station 36. Note that the total available bandwidth used was not changed in that it started at 54 (12+12+18+12) and ended at 54 (13+13+13+13).

Advantageously, this system and method facilitates improving the image quality of a broadband or wide-band image comprised of a plurality of sub-images generated by a plurality of input devices, such as camera C1-C4. The overall improvement or load balancing of the data substantially optimizes or improves the picture quality of a video transmission system that, in turn, improves the overall video conference experience.

Figure 9:
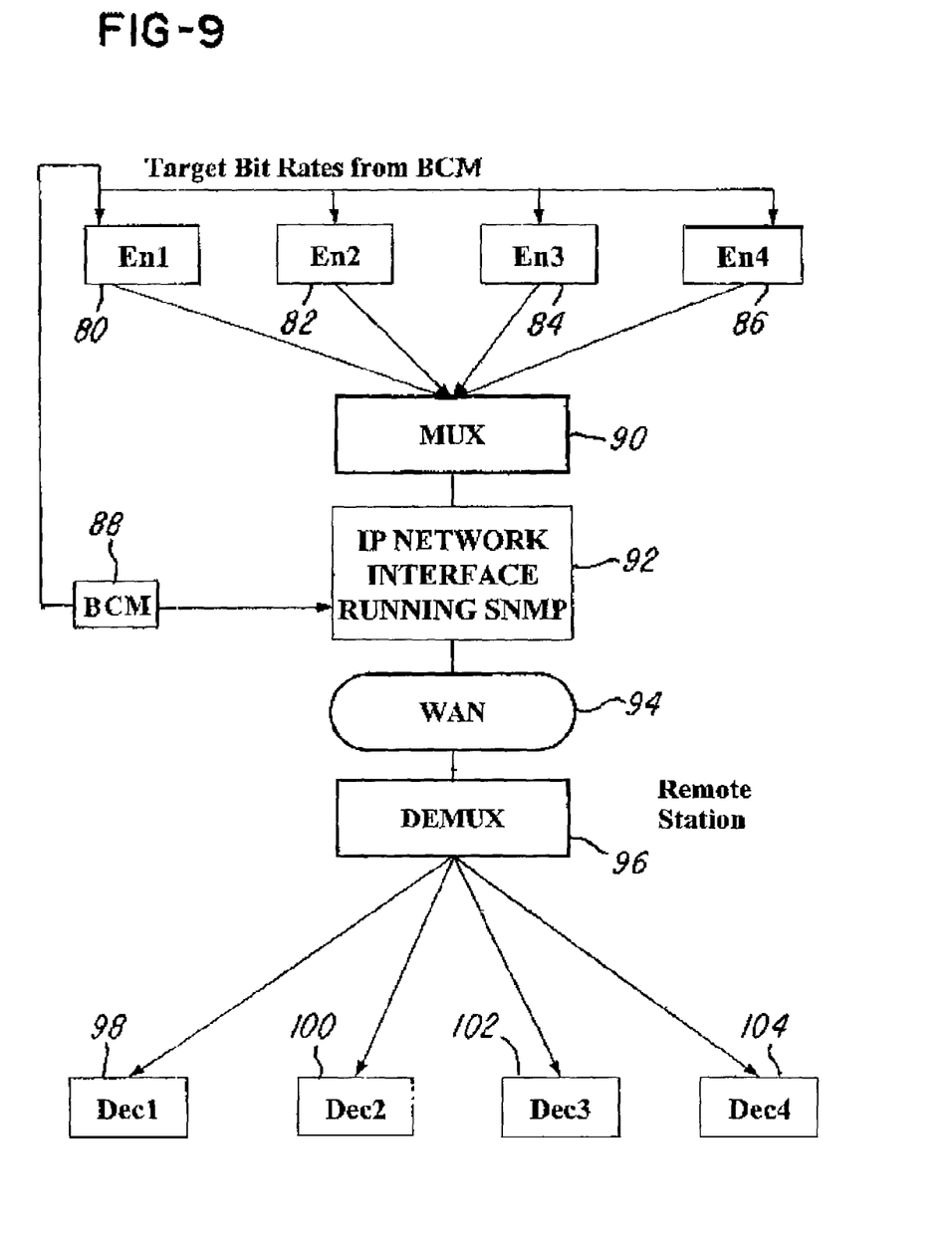
FIG. 9 is a view of another embodiment of the invention.

FIG. 9 illustrates another embodiment of the invention showing a plurality of commercially available encoders 80, 82, 84 and 86, such as the encoder model VS 4000, available from Polycom Inc. of Pleasanton, Calif. The embodiment further comprises a Bit rate Control Manager 88 (BCM) having the features mentioned earlier herein relative to BCM 30 and a multiplexer 90 as shown. In the embodiment described, each encoder En1-En4 80-86 is controlled through an IP network interface 92, which can be based on Ethernet technology, other IEEE 802.x packet networks, serial links, or any other appropriate network technology, and running the conventionally known simple network management protocol (SNMP, RFC3416). The IP network interface 92 runs the SNMP and is used to output the coded data from the encoders 80-86 to a gateway that connects the IP network interface 90 to a wide area network (WAN) 94 and to a demultiplexer 96, the decoders 98, 100, 102 and 104 at the remote location 36.

Using the SNMP, the BCM 88 sends SNMP control messages and can set the target bit rate for all of the encoders 80-86 using the method and system described earlier herein.

In this embodiment of the invention, the BCM 88 requests in fixed time intervals, for example, every 10 seconds, the current status of all encoders 80-86 via the interface 92. The BCM 88 utilizes the system and method described earlier herein to calculate the new target bit rate for each encoder 80-86. After the calculation of the new bit rate is determined for each encoder 80-86, the BCM 88 communicates the new bit rate to each of the encoders 80-86 using the SNMP control message.

While the systems and methods herein described, and the forms of apparatus for carrying these systems and methods into effect, constitute one embodiment of this invention, it is to be understood that the invention is not limited to these precise methods and forms of apparatus, and that changes may be made in either without departing from the scope of the invention, which is defined in the appended claims.

The invention claimed is:

1. A video conferencing system, comprising,
a plurality of cameras that capture a spatially adjacent scene,
an encoding system comprising a plurality of encoders that compress and transmit a plurality of pictures from said plurality of cameras;
said encoding system comprising a bit rate control manager coupled to each of said plurality of encoders for determining a bit rate for each of said plurality of encoders such that a quality of the reproduced bit stream produced by each of said plurality of encoders is substantially the same;
wherein the quality of the reproduced bit streams is measured by one or more parameters selected from the group consisting of:
a peak signal-to-noise ratio (PSNR) calculated between a plurality of uncoded source pictures and a plurality of produced reference pictures;
a sum of square difference (SSD) calculated between a plurality of uncoded source pictures and a plurality of produced reference pictures;
a Sum of Absolute Differences (SAD) calculated between a plurality of uncoded source pictures and a plurality of produced reference pictures.

2. The system as recited in claim 1, wherein said bit rate control manager uses linear optimization to determine the bit rate for each of the plurality of encoders.

3. The system as recited in claim 1, wherein said bit rate control manager determines the bit rate for each of the plurality of encoders in fixed time intervals.

4. The system as recited in claim 3, wherein said fixed time intervals are the inverse of a coded frame rate for said plurality of pictures or an integer multitude thereof.

5. The system as recited claim 1, wherein said bit rate control manager determines the bit rate for each of the plurality of encoders in variable time intervals.

6. The system as recited in claim 5, wherein said bit rate control manager determines said variable time intervals by input through a user interface.

7. The system as recited in claim 1, wherein the bit rate control manager is a distributed application and comprised as an integral part of each encoder.

8. The system as recited in claim 1, wherein the bit rate control manager is external to each of said plurality of encoders.

9. The system as recited in claim 8 wherein said bit rate control manager receives encoding input information through a communication link from the plurality of encoders, and sends target bit rate output information through a communication link to the plurality of encoders.

10. The system as recited in claim 8, wherein said communication link is a serial link.

11. The system as recited in claim 8, wherein said communication link follows one of the specifications of the IEEE 802.x or Ethernet (IEEE 802.3).

12. The system as recited in claim 8, wherein said protocol is the simple network management protocol (RFC3416).

13. A method of encoding video from a plurality of cameras using a plurality of encoders, wherein the plurality of cameras capture a spatially adjacent scene, the method comprising:
receiving at least one parameter from each of the plurality of encoders, the parameter being indicative of a quality of a bitstream produced by the encoder; and
determining a bit rate for each of the encoders as a function of the received parameters;
wherein the at least one parameter is selected from the group consisting of:
a peak signal-to-noise ratio (PSNR) calculated between a plurality of uncoded source pictures and a plurality of produced reference pictures;

a sum of square difference (SSD) calculated between a plurality of uncoded source pictures and a plurality of produced reference pictures;
a Sum of Absolute Differences (SAD) calculated between a plurality of uncoded source pictures and a plurality of produced reference pictures.

14. The method of claim 13 further comprising receiving a bit rate from each of the plurality of encoders wherein the determined bit rate is determined as a function of the received parameters and the received bit rates.

* * * * *